(12) United States Patent
Revelis

(10) Patent No.: US 7,478,575 B2
(45) Date of Patent: Jan. 20, 2009

(54) BRAKE ACTUATING ASSEMBLY FOR A VEHICLE

(75) Inventor: Peter Revelis, Newmarket (CA)

(73) Assignee: Ventra Group Inc., Ontario (CA)

( * ) Notice: Subject to any disclaimer, the term of this patent is extended or adjusted under 35 U.S.C. 154(b) by 840 days.

(21) Appl. No.: 10/949,393

(22) Filed: Sep. 27, 2004

(65) Prior Publication Data

US 2006/0070485 A1    Apr. 6, 2006

(51) Int. Cl.
*B60K 23/00* (2006.01)
(52) U.S. Cl. .................................. 74/473.16
(58) Field of Classification Search ............. 74/33, 74/34, 471 R, 473.16, 473.17, 473.3, 519, 74/523, 526, 528; 192/223.4, 41 S, 81 C, 192/17 D, 12 BA
See application file for complete search history.

(56) References Cited

U.S. PATENT DOCUMENTS

| | | | |
|---|---|---|---|
| 2,690,240 A | 9/1954 | Schroeder | |
| 4,282,771 A | 8/1981 | Grube | |
| 5,485,764 A | 1/1996 | Sugimoto et al. | |
| 5,533,420 A | 7/1996 | Perisho | |
| 6,550,354 B2 * | 4/2003 | Kim | 74/512 |
| 6,637,571 B2 * | 10/2003 | Arnold et al. | 192/41 S |
| 6,662,915 B2 | 12/2003 | Bigsby | |

* cited by examiner

*Primary Examiner*—Vicky A Johnson
(74) *Attorney, Agent, or Firm*—Pillsbury Winthrop Shaw Pittman LLP

(57) ABSTRACT

A brake actuating assembly for use in a vehicle includes a clutch assembly that includes a pinion provided on one of a lever and a mounting bracket of the actuating assembly. The pinion includes a shaft and a plurality of teeth that interact with an arcuate rack of teeth provided on the other of the lever and the mounting bracket. The clutch assembly also includes a torsion clutch spring that includes a plurality of coils wrapped around the shaft of the pinion, a fixed end at one end of the coils, and a free end at an opposite end of the coils. At least one of the shaft of the pinion and the spring is tapered in an axial direction thereof such that an interference fit between the spring and the shaft is lower near the free end of the spring than near the fixed end of the spring.

23 Claims, 6 Drawing Sheets

BRAKE ACTUATING ASSEMBLY FOR A VEHICLE

BACKGROUND OF THE INVENTION

1. Field of the Invention

The present invention relates generally to a brake actuating assembly for a vehicle, and more specifically to a clutch assembly within the brake actuating assembly.

2. Discussion of Related Art

Brake actuating assemblies for vehicle parking brakes are manufactured in many different designs, including foot pedal brake actuators and hand brake actuators. A foot pedal brake actuator is typically mounted near the floor of the vehicle and includes a lever having a pedal that is designed to be pushed by the operator's foot in a brake applying direction to set the parking brake. As the lever is moved in the brake applying direction, a clutch ensures that the position of the lever is maintained. In order to disengage the parking brake, the clutch must be released. In some vehicles, a release handle is mounted above the pedal. This handle allows the operator to disengage the parking brake by pulling the release handle, which releases the clutch and allows the pedal to move in a brake releasing direction. Some vehicles that have this type of parking brake actuator also have an automatic parking brake release that includes a vacuum motor or servo that is operatively connected to the clutch. When the vehicle is running and the transmission is shifted into gear, a solenoid valve is actuated. The solenoid valve causes vacuum to be applied to the vacuum motor, which causes the clutch to release the lever, thereby allowing the lever and pedal to move in the brake releasing direction.

Another type of brake actuator is a hand brake actuator that is typically mounted toward the center of the vehicle so that the operator of the vehicle may set and release the brake with one hand. This type of brake actuator typically includes a lever that is pulled upward by the operator to set the parking brake. Many hand brake actuators also include a clutch that allows the position of the lever to be maintained, even when the operator releases the lever. A push button is typically disposed at a distal end of the lever and is pushed by the operator to release the clutch and allow the lever to be moved so that the parking brake may be disengaged.

In both types of brake actuator assemblies, the design of the clutch contributes to the performance of the entire assembly. Because the clutch operates as a torsion lock system, any freewheel backlash that occurs will contribute to a load drop off within the parking brake system. Although the load drop off may be compensated for with a more "robust" design, such a design creates a heavier, more expensive brake actuator assembly.

SUMMARY OF THE INVENTION

One aspect of the present invention provides a brake actuating assembly for use in a vehicle having a brake system. The brake actuating assembly includes a mounting bracket for mounting the brake actuating assembly to the vehicle, and a lever that is mounted to the mounting bracket for pivotal movement about a pivot axis in a brake applying direction and in a brake releasing direction. The lever is configured to be engaged and moved by a person in at least the brake applying direction, and is connectable to the brake system of the vehicle such that movement of the lever in the brake applying direction activates the brake system and movement of the lever in the brake releasing direction de-activates the brake system. An arcuate rack of teeth is provided on one of the lever and the mounting bracket, and a clutch assembly is constructed and arranged to interact with the arcuate rack of teeth. The clutch assembly includes a pinion provided on the other of the lever and the mounting bracket. The pinion includes a shaft and a plurality of teeth disposed circumferentially around the shaft. The plurality of teeth on the pinion engage the arcuate rack of teeth. The clutch assembly also includes a torsion clutch spring that includes a plurality of coils, a fixed end at one end of the coils, and a free end at an opposite end of the coils. The coils are wrapped around the shaft of the pinion. The fixed end is connected to the other of the lever and the mounting bracket. The torsion clutch spring is normally in a contracted position and frictionally engages the shaft of the pinion in an interference fit. The torsion clutch spring in the contracted position is arranged to (a) allow the pinion to rotate in a first rotational direction caused by movement of the lever in the brake applying direction, and (b) prevent rotation of the pinion in a second rotational direction opposite the first rotational direction to thereby prevent movement of the lever in the brake releasing direction. The free end of the torsion clutch spring is movable to move the torsion clutch spring to an expanded position that allows the pinion to rotate in both the first and second rotational directions, thereby allowing the lever to move in both the brake applying and releasing directions. At least one of the shaft of the pinion and the torsion clutch spring is tapered in an axial direction thereof such that the interference fit between the torsion clutch spring and the shaft is lower near the free end of the torsion clutch spring than near the fixed end of the torsion clutch spring.

Another aspect of the present invention provides a clutch assembly for a brake actuating assembly for use in a vehicle having a brake system. The brake actuating assembly includes a mounting bracket and a lever that is mounted to the mounting bracket for pivotal movement about a pivot axis in a brake applying direction and a brake releasing direction. The lever is configured to be engaged and moved by a person in at least the brake applying direction, and is connectable to the brake system of the vehicle such that movement of the lever in a brake applying direction activates the brake system and movement of the lever in a brake releasing direction de-activates the brake system. The clutch assembly includes a pinion constructed and arranged to be provided on at least one of the lever and the mounting bracket. The pinion includes a shaft and a plurality of teeth disposed circumferentially around the shaft. The plurality of teeth on the pinion are configured to engage an arcuate rack of teeth provided on the other of the lever and the mounting bracket. The clutch assembly also includes a torsion clutch spring that includes a plurality of coils, a fixed end at one end of the coils, and a free end at an opposite end of the coils. The coils are wrapped around the shaft of the pinion. The fixed end is connectable to the other of the lever and the mounting bracket. The torsion clutch spring is normally in a contracted position that frictionally engages the shaft of the pinion in an interference fit. The torsion clutch spring in the contracted position is arranged to (a) allow the pinion to rotate in a first rotational direction caused by movement of the lever in the brake applying direction, and (b) prevent rotation of the pinion in a second rotational direction opposite to the first rotational direction to thereby prevent movement of the lever in the brake releasing direction. The free end of the torsion clutch spring is movable to move the torsion clutch spring to an expanded position that allows the pinion to rotate in both the first and second rotational directions, thereby allowing the lever to move in both the brake applying and releasing directions. At least one of the shaft of the pinion and torsion clutch spring is tapered in an axial direction thereof such that the interference fit between the torsion clutch spring and the shaft is lower near the free end of the torsion clutch spring than near the fixed end of the torsion clutch spring.

Yet another aspect of the present invention provides a vehicle with a brake system and a brake actuating assembly. The brake actuating assembly includes a mounting bracket for mounting the brake actuating assembly to the vehicle, and a lever that is mounted to the mounting bracket for pivotal movement about a pivot axis in a brake applying direction and in a brake releasing direction. The lever is configured to be engaged and moved by a person in at least the brake applying direction. The lever is connectable to the brake system of the vehicle such that movement of the lever in the brake applying direction activates the brake system and movement of the lever in the brake releasing direction de-activates the brake system. An arcuate rack of teeth is provided on one of the lever and the mounting bracket. A clutch assembly is constructed and arranged to interact with the arcuate rack of teeth. The clutch assembly includes a pinion that is provided on the other of the lever and the mounting bracket. The pinion includes a shaft and a plurality of teeth that are disposed circumferentially around the shaft. The plurality of teeth on the pinion engage the arcuate rack of teeth. A torsion clutch spring includes a plurality of coils, a fixed end at one end of the coils, and a free end at an opposite end of the coils. The coils are wrapped around the shaft of the pinion. The fixed end is connected to the other of the lever and the mounting bracket. The torsion clutch spring is normally in a contracted position that frictionally engages the shaft of the pinion in an interference fit. The torsion clutch spring in the contracted position is arranged to (a) allow the pinion to rotate in a first rotational direction caused by movement of the lever in the brake applying direction, and (b) prevent rotation of the pinion in a second rotational direction opposite the first rotational direction to thereby prevent movement of the lever in the brake releasing direction. The free end of the torsion clutch spring is movable to move the torsion clutch spring to an expanded position that allows the pinion to rotate in both the first and second rotational directions, thereby allowing the lever to move in both the brake applying and releasing directions. At least one of the shaft of the pinion and the torsion clutch spring is tapered in an axial direction thereof such that the interference fit between the torsion clutch spring and the shaft is lower near the free end of the torsion clutch spring than near the fixed end of the torsion clutch spring.

These and other aspects of the invention will become apparent from the following detailed description when taken in conjunction with the accompanying drawings, which are part of this disclosure and which illustrate, by way of example, the principles of this invention.

BRIEF DESCRIPTION OF THE DRAWINGS

Features of the invention are shown in the drawings, in which like reference numerals designate like elements. The drawings form part of this original disclosure, in which.

DETAILED DESCRIPTION OF EMBODIMENTS OF THE INVENTION

Figure 1:
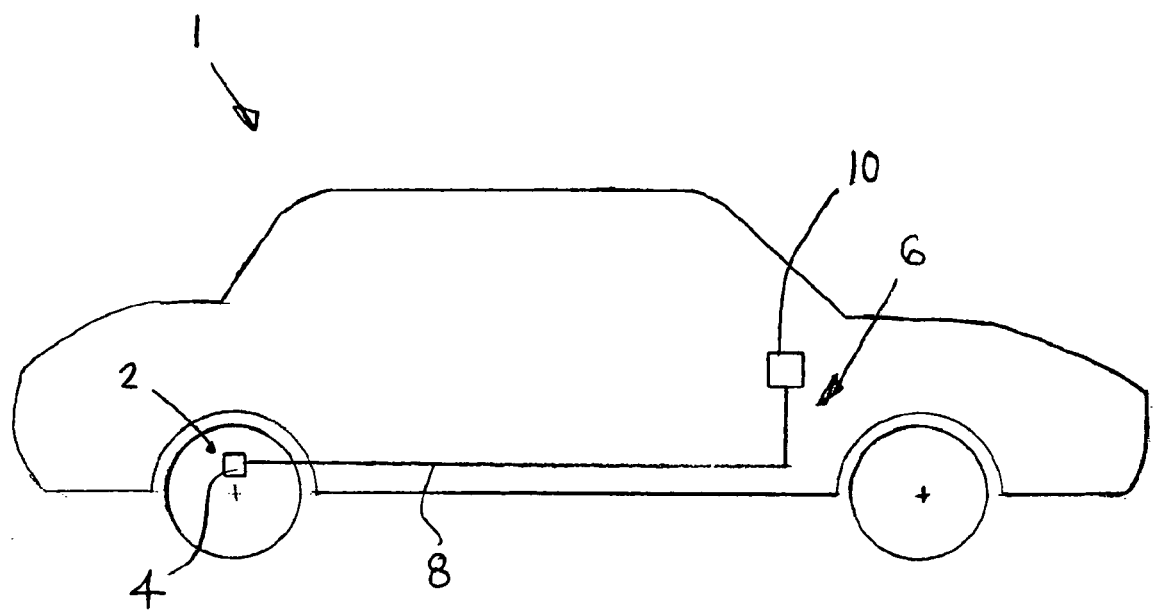
FIG. 1 is a schematic of a vehicle with a brake system and a brake actuating assembly of the present invention.

FIG. 1 generally shows a vehicle 1 with a brake system 2. The brake system 2 may be any known type of brake system, and may include disc brakes, drum brakes, or any other type of brake that is commonly used in vehicles. As shown, the brake system 2 includes a rear brake 4. It is understood that although only the right side of the vehicle 1 is shown, a rear brake 4 may also be disposed on a left side of the vehicle 1 in a like manner. Although the rear brake 4 is typically actuated by the operator of the vehicle 1 via a hydraulic system (not shown), it is common for vehicles to also be equipped with an emergency brake system 6 that allows mechanical actuation of the rear brake 4 in the event that the hydraulic system fails during operation of the vehicle 1. The emergency brake system 6 may also be used as a "parking brake" that may be used to actuate the rear brake 4 even when the vehicle 1 is not being operated. Instead of relying on the hydraulic system, the emergency/parking brake system 6 includes a cable 8 that is connected at one end to the rear brake 4 of the vehicle 1 and at the other end to a brake actuating assembly 10. It is contemplated that the brake actuating assembly 10 may be used with brake systems 2 that have either manual adjust mechanisms or self-adjust mechanisms, and the adjustability may be incorporated in to the brake actuating assembly 10 itself.

Figure 2:
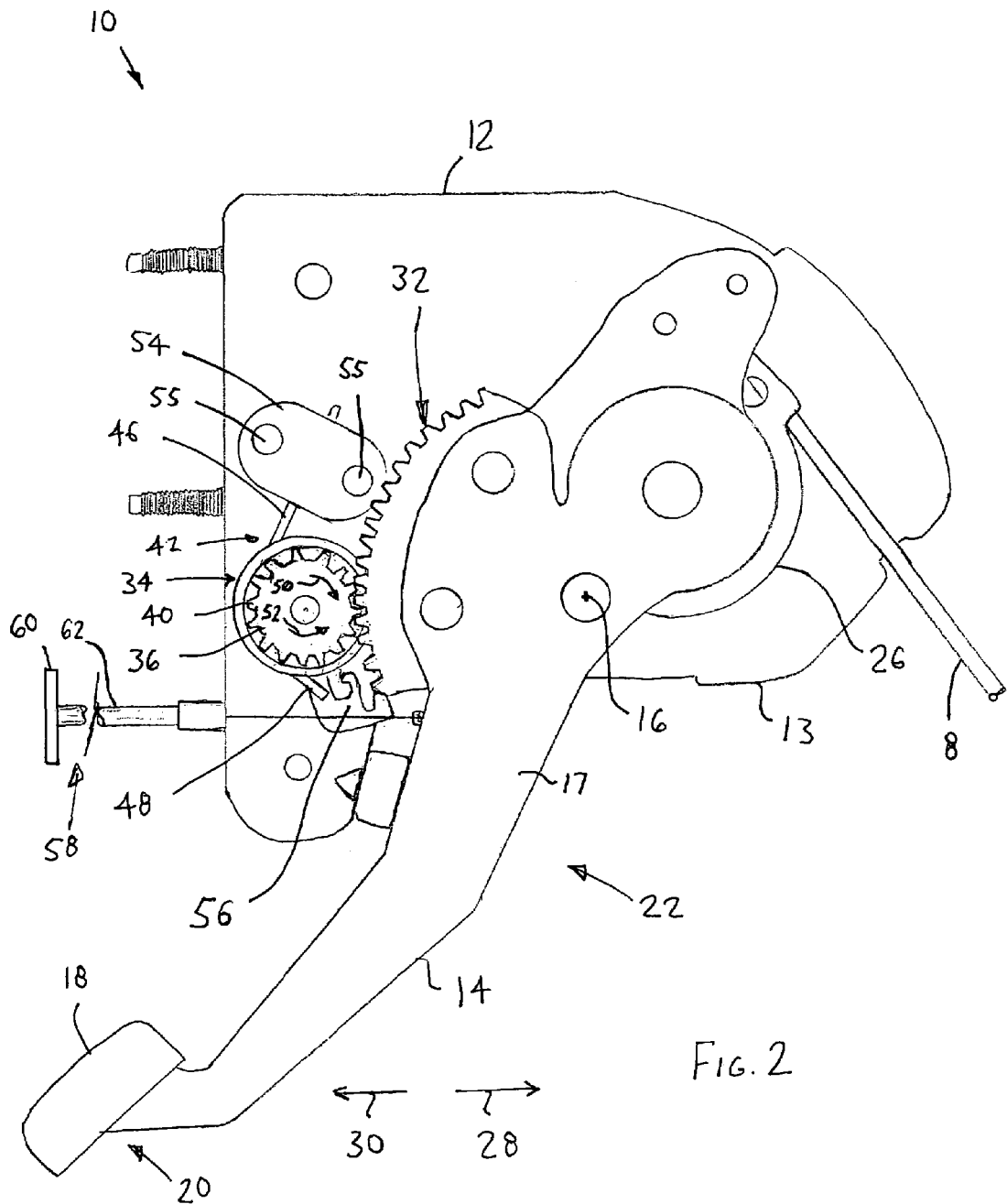
FIG. 2 is a side view of the brake actuating assembly of FIG. 1 in a fully released position, with a cover removed.

FIG. 2 shows the brake actuating assembly 10 in greater detail. The brake actuating assembly 10 includes a mounting bracket 12 for mounting the brake actuating assembly 10 to the vehicle 1. The brake actuating assembly 10 is mounted to the vehicle 1 by known methods at a location near the other pedals (not shown) that are typically used by the operator to affect movement of the vehicle 1, such as an accelerator pedal, a brake pedal, and a clutch pedal. For example, the brake actuating assembly 10 may be mounted such that it sits forward, downward, and to the left of the operator when the operator is facing forward in the driver's seat of the vehicle 1. In such a position, the operator may operate the brake actuating assembly 10 with a foot, yet the brake actuating assembly 10 does not interfere with the normal operation of the vehicle 1.

The mounting bracket 12 may be constructed from any suitable material, including but not limited to metal. Preferably, the mounting bracket 12 is formed from steel. The shape of the mounting bracket 12 is largely dictated by the size and configuration of the internal components of the brake actuating assembly 10. It is understood that the mounting bracket 12 may include a plurality of pieces that are connected by known methods (e.g., welding, fasteners, etc.) to form one unit. Also, internal structural components that are mounted to an outer shell 13 of the mounting bracket 12 are considered to be part of the mounting bracket 12 and details of such components are not illustrated here for clarity. The outer shell 13 of the mounting bracket is preferably designed to substantially enclose the internal parts of the assembly 10. A portion of the outer shell 13 of the mounting bracket 12 is removed in the Figures so that the internal parts may be shown.

Figure 3:
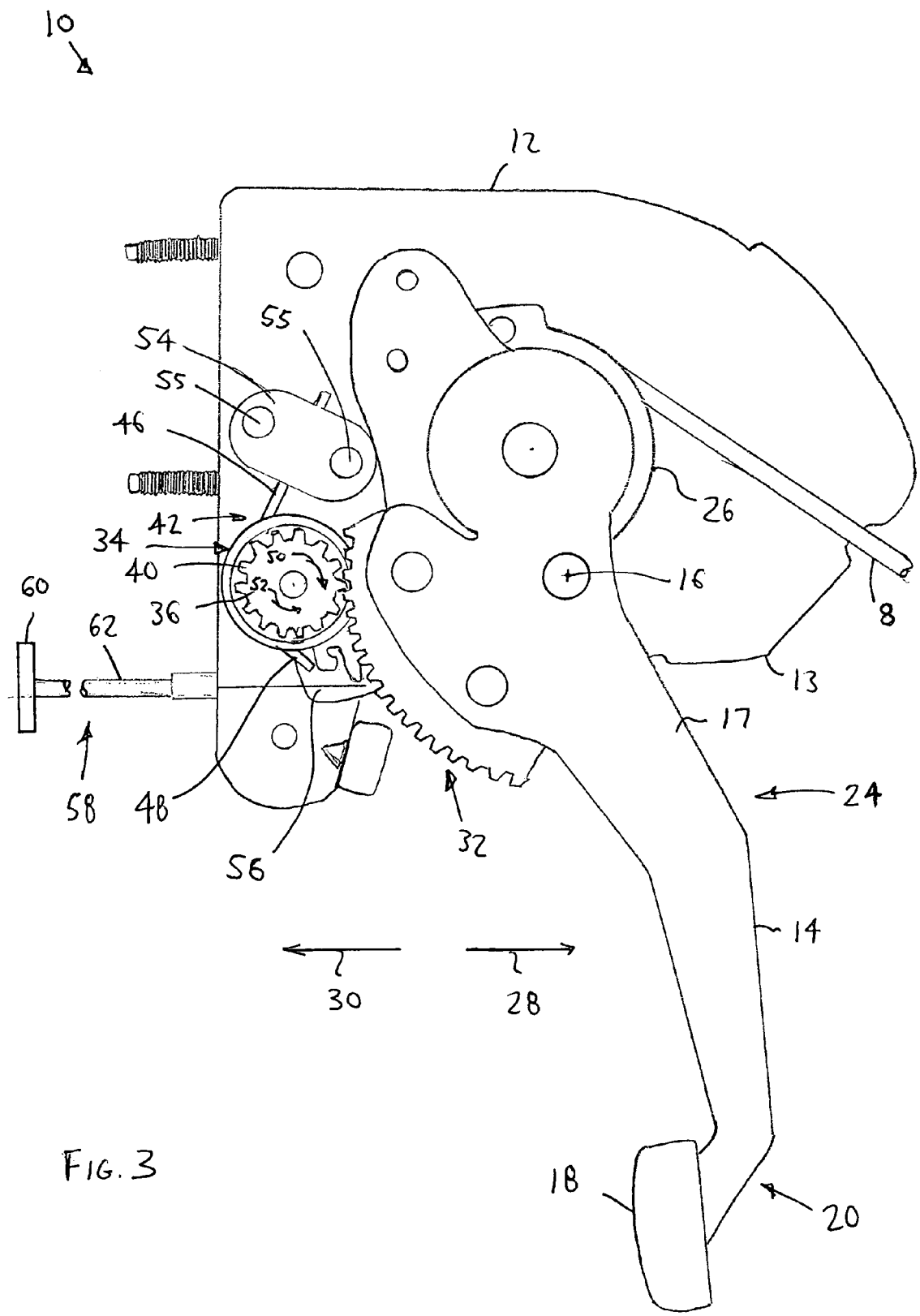
FIG. 3 is a side view of the brake actuating assembly of FIG. 2 in a fully engaged position.
Figure 4:
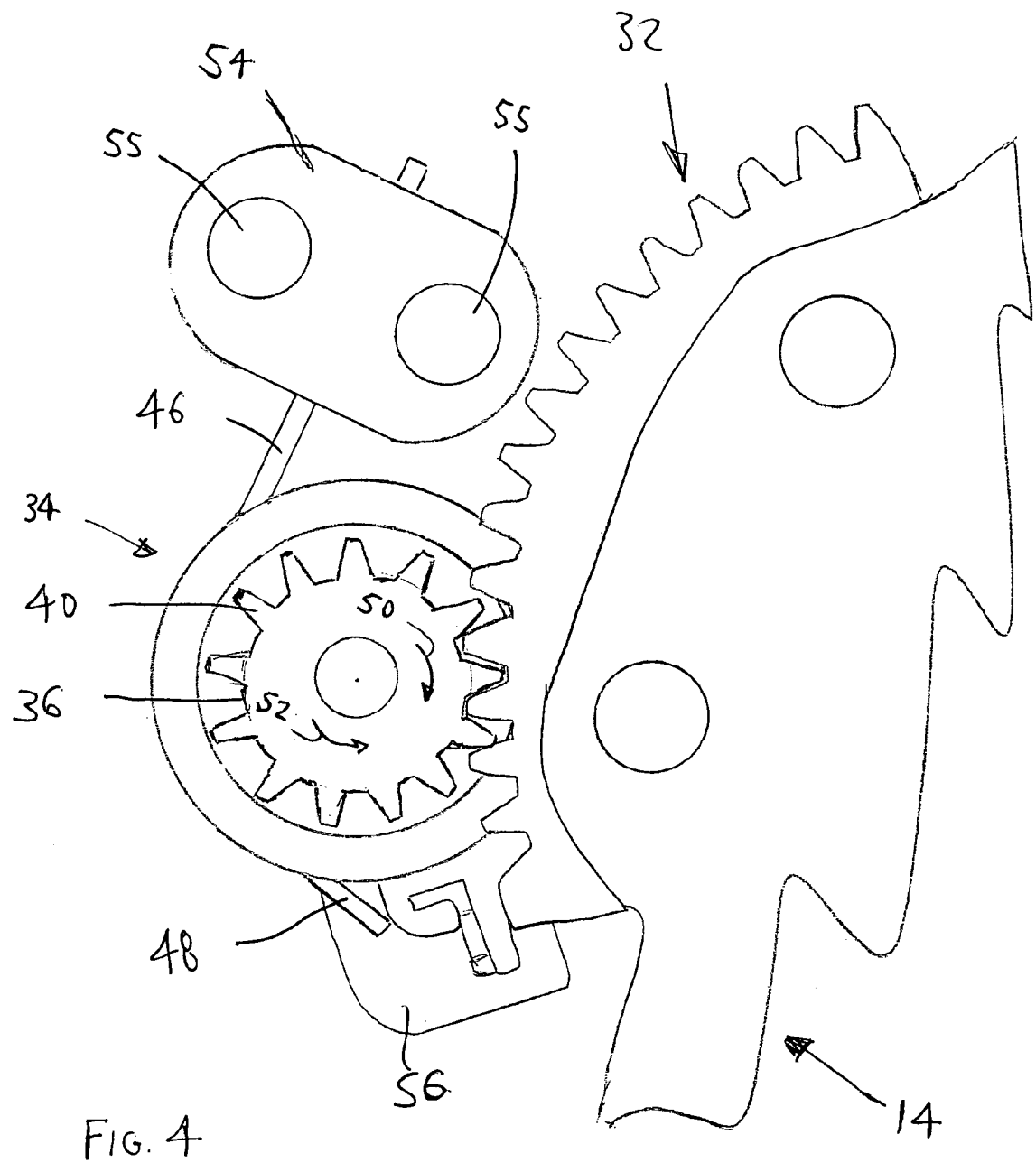
FIG. 4 is detailed side view of a clutch assembly of the brake actuating assembly of FIG. 2.

The assembly 10 also includes a lever 14 that is pivotally mounted to the mounting bracket 12 so that it may move relative to the mounting bracket 12. The lever 14 pivots about a pivot axis 16 and is preferably mounted to the mounting bracket 12 at the pivot axis 16. The lever 14 is configured to be engaged and moved by a person. For example, as shown in FIGS. 2 and 3, in one embodiment, the assembly 10 is a foot pedal actuator, and the lever 14 is a pedal arm 17 that has a pedal pad 18 on a distal end 20 that is away from the pivot axis 16. The pedal pad 18 is configured to be engaged by a person's foot. The lever 14 is preferably constructed of metal, but may also be molded from an engineered plastic or made from any other material that can withstand both the forces being applied to the lever 14 during operation, and the frequency of the forces being applied to the lever 14 over the lifetime of the vehicle 1. The pedal pad 18 is preferably covered with an anti-slip material such as textured rubber or the like. The pedal pad 18 may be an integral part of the pedal arm 17 and may include texturing so as to provide a non-slip surface for the person's foot to engage, or the pedal pad 18 may be a separate piece that is connected to the distal end 20 by known methods. In another embodiment, not shown, the assembly 10 is a hand brake actuator, and the lever 14 is configured to be engaged and moved by a person's hand. The term "lever" is intended to encompass both configurations and the illustrated embodiment is not intended to be limiting in any way.

Returning to the Figures, FIG. 2 shows the lever 14 in a fully released position 22, and FIG. 3 shows the lever 14 in a fully engaged position 24. The fully released position 22 is a position at which the brake actuating assembly 10 is normally located and in this position, it does not actuate the brake system 2. In the fully released position 22, the rear brake 4 is biased to a disengaged position. Such biasing is typically provided by at least one biasing member, such as the springs in the brake system 2 that bias the rear brakes 4 away from the wheel of the vehicle 1 so that they are disengaged. The biasing force provided by the biasing member also translates through the brake cable 8 to the brake actuating assembly 10 such that it biases the lever 14 towards the fully released position 22.

The fully engaged position 24 is realized when the lever 14 is pushed to the maximum extent allowed, and in this position the brake actuating assembly 10 has fully actuated the brake system 2. The lever 14 is connectable to the brake system 2 of the vehicle 1 via a reel or cam 26, which is attached to the cable 8 such that movement of the lever 14 in a brake applying direction 28 increases the tension in the cable 8, which overcomes the biasing of the biasing member at the rear brake(s) 4, thereby allowing actuation of the rear brake(s) 4. Conversely, movement of the lever 14 in a brake releasing direction 30 de-activates the brake system 2 by decreasing the tension in the cable 8, which allows the rear brake(s) 4 to be biased to disengage from the wheels of the vehicle 1. The brake applying direction 28, shown in FIGS. 2 and 3, is the direction toward the fully engaged position 24, and the brake releasing direction 30 is the direction toward the fully released position 22.

In the illustrated embodiment, an arcuate rack of teeth 32 is connected to the lever 14 and moves with the lever 14. The rack of teeth 32 may be a separate part that is rigidly connected to the lever 14, or the rack of teeth 32 may be integral with the lever 14. The curvature of the rack of teeth 32 is determined by the distance of the teeth from the pivot axis 16 so that individual teeth may travel along the same path as the lever 14 rotates. This curvature may have a consistent radius centered at pivot axis 16. This allows for the indexing of the lever 14 as the lever 14 moves in the brake applying direction 28. The rack of teeth 32 is preferably made from steel or any stiff metal or other material that can withstand the repetitive forces being applied to the teeth of the rack 32.

The actuating assembly 10 also includes a clutch assembly 34 that interacts with the rack of teeth 32. The clutch assembly 34 controls the movement of the lever 14 and, therefore, the actuation of the emergency/parking brake system 6. The clutch assembly 34 includes a pinion 36 that is rotatably mounted to the mounting bracket 12. As shown in more detail in FIGS. 5 and 6, the pinion 36 includes a shaft 38 (which can also be referred to as a hub) and a plurality of teeth 40 that are disposed circumferentially around the shaft 38. As shown, the plurality of teeth 40 are preferably located at one end of the shaft 38. The plurality of teeth 40 are configured to engage the arcuate rack of teeth 32 such that the pinion 36 rotates in a first direction 50 as the lever 14 is moved in the brake applying direction 28, and in a second direction 52, opposite the first direction 50, when the lever 14 moves in the brake releasing direction 30. It is also contemplated that the pinion 36 may be provided on the lever 14 and the arcuate rack of teeth 32 may be provided on the mounting bracket 12 in such a way that the clutch assembly 34 interacts with the actuating assembly 10 in substantially the same way, as described below. The illustrated embodiment is not intended to be limiting in any way.

Figure 6:
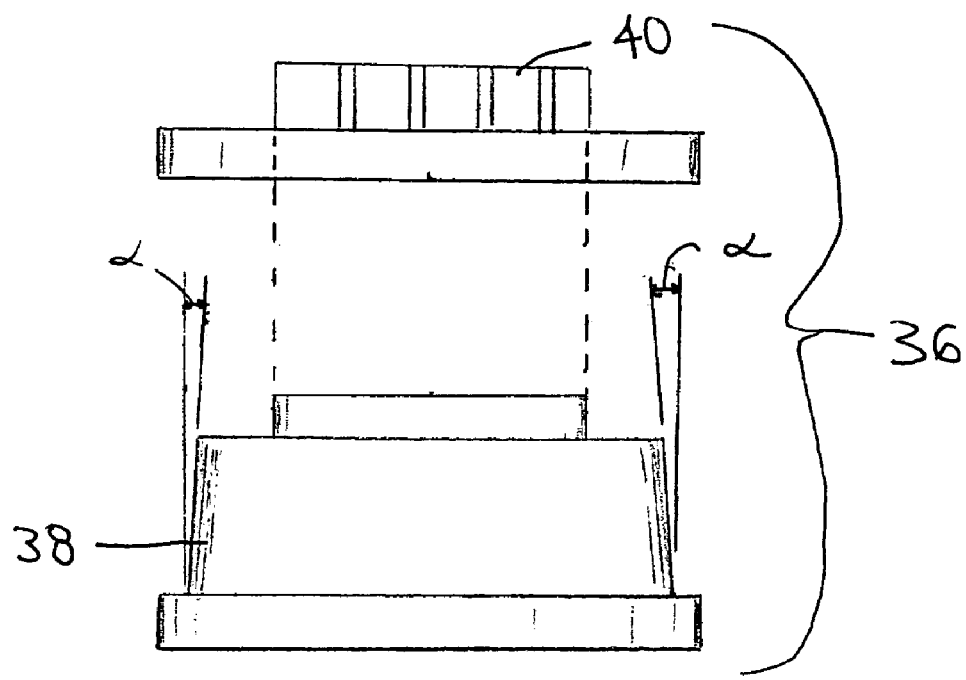
FIG. 6 is a side view of a pinion of the clutch assembly of FIG. 5.

As shown in FIG. 6, the pinion 36 may include two or more parts that are connectable so as to create one structure upon assembly. Such a design may facilitate the assembly of the clutch assembly 34, as will become apparent in the discussion below. It is contemplated that the pinion 36 may have any suitable configuration and the illustrated embodiment is not intended to be limiting in any way.

Figure 5:
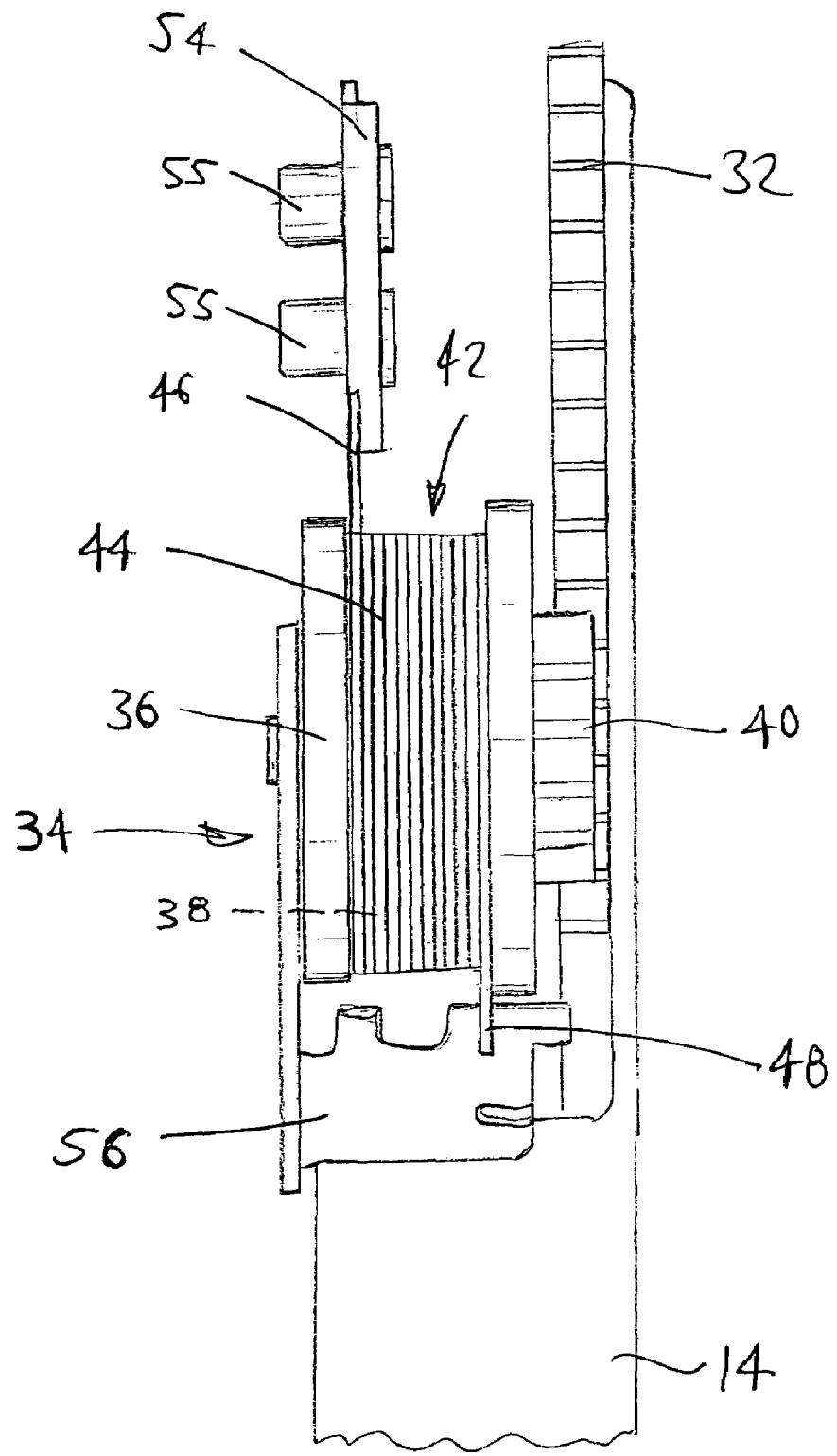
FIG. 5 is a detailed front view of the clutch assembly of FIG. 4.

As shown in FIG. 5, the clutch assembly 34 also includes a torsion clutch spring 42. The torsion clutch spring 42 includes a plurality of coils 44, a fixed end 46 at one end of the coils 44, and a free end 48 at an opposite end of the coils 44. The coils 44 are wrapped around the shaft 38 of the pinion 36, and the fixed end 46 is connected to the mounting bracket 12 either directly, or is mounted to an intermediary part that is connected to the mounting bracket 12. As shown in the Figures, the fixed end 46 is clamped to the mounting bracket 12 with a clamp 54 and a pair of fasteners 55. The free end 48 of the torsion clutch spring 42 extends away from the coils 44, and will be discussed in further detail below. The cross-sectional shape of the coils 44 and the ends 46, 48 of the torsion clutch spring 42 may be any conventional shape, including but not limited to rectangular and round. Preferably, the cross-sectional shape of the components of the torsion clutch spring 42 is substantially rectangular. Such a shape provides a greater surface area between the torsion clutch spring 42 and the pinion 36 for increased frictional engagement, which may improve the operation of the clutch assembly 34, as will become evident below.

The torsion clutch spring 42 is normally in a contracted position such that it frictionally engages the shaft 38 of the pinion 36 in an interference fit, thereby creating a torsion lock system. The interference fit is created because the inner diameter of the coils 44 is less than the outer diameter of the shaft 38 of the pinion 36. This interference fit creates a force that is normal (perpendicular) to the outer surface of the shaft 38, which provides resistance to the rotation of the pinion 36 in the second direction 52. That is, the interference fit, the direction of the turns in the coils 44, the mounting of the fixed end 46, in conjunction with the direction of the first direction 50 of rotation provide a clutch device that allows rotation of the pinion 36 in the first direction 50, but does not allow rotation of the pinion 36 in the second direction 52, even through the cable 8 biases the lever 14 in the brake releasing direction 30, as will be described in further detail below.

As force is applied to the lever 14, against the bias of the cable 8, and the lever 14 is moved in the brake applying direction 28, the torsion clutch spring 42 allows the pinion 36 to rotate in the first direction 50. This is because the initial normal force and friction combine to form shear between the torsion clutch spring 42 and the pinion 36, and as a result, the torsion clutch spring 42, along with its free end 48, begins to rotate with the pinion 36. Because one end of the torsion clutch spring is fixed, the free end 48 will keep on turning until it opens all of the coils 44 of the torsion clutch spring 42 sufficient enough to reduce the interference fit and normal force such that the shear force between the pinion 36 and the torsion clutch spring 42 is overcome. Once the shear force is overcome, the pinion 36 is able to rotate with respect to the torsion clutch spring 42. When the force is removed from the lever 14 and the lever 14 stops moving in the brake applying direction 28, the tension in the cable 8 pulls back on the lever 14. Because the pinion 36 is able to rotate at this instant, the pinion 36 will start to move in the second direction 52.

When the pinion 36 starts to rotate in the second direction 52, the coils 44 of the torsion clutch spring 42, starting with the coil at the fixed end 46, contract around the shaft 38 of the pinion 36, one by one, thereby increasing the interference fit, the normal force, and the shear force between the pinion 36 and the torsion clutch spring 42 until the shear force prevents the pinion 36 from further rotation. The rotation in the second direction 52 that the pinion 36 undergoes before it is stopped corresponds to the previously described rotation that the free end 48 of the torsion clutch spring 42 underwent to allow the pinion 36 to rotate in the first direction 50 with respect to the torsion clutch spring 42. This rotation also corresponds to the freewheel backlash, which translates to the load drop off discussed above. The less the rotation that the free end 48 has to undergo to expand the torsion clutch spring 42 to reduce the shear force, the less the load drop off in the emergency brake system 6.

In order for the pinion 36 to freely rotate in the second direction 52, and allow the lever 14 to move in the brake releasing direction 30, the normal force exerted by the torsion clutch spring 42 on the pinion 36 should be sufficiently reduced so as to decrease the shear force and allow continued slippage of the pinion 36 relative to the torsion clutch spring 42. To accomplish this, the coils 44 should be uncoiled a sufficient amount so as to open the coils 44 and decrease the normal force to a level that allows the pinion 36 to rotate in response to the tension in the cable 8. This may be accomplished by moving the free end 48 of the torsion clutch spring 42 so that the torsion clutch spring 42 is moved to an expanded position. Once the torsion clutch spring 42 is in the expanded position, the pinion 36 may rotate in both the first 50 and the second directions 52, and the lever 14 is able to move in both the brake applying 28 and brake releasing directions 30. If there is no force being applied by the operator to the lever 14, the lever 14 will return to the fully released position 22, due to the tension in the cable 8, so long as the torsion clutch spring 42 is in the expanded position.

As shown in FIG. 6, the shaft 38 of the pinion 36 is tapered in an axial direction thereof, at a taper angle $\alpha$, such that the outer diameter of the shaft 38 at the fixed end 46 of the torsion clutch spring 42 is greater than the outer diameter of the shaft 38 at the free end 48 of the torsion clutch spring 42. This allows the interference fit between the torsion clutch spring 42 and the shaft 38 of the pinion 36 to be lower near the free end 48 of the torsion clutch spring 42 than near the fixed end 46 of the torsion clutch spring 42. It is contemplated that the interference fit near the free end 48 may even be zero. By providing a clutch assembly with a greater interference fit at the fixed end 46 of the torsion clutch spring 42, the free end 48 of the torsion clutch spring 42 does not need to rotate as much to uncoil the coils, i.e., move the torsion clutch spring 42 to the expanded position, when compared to a conventional clutch assembly that has a substantially constant interference fit along the pinion. This is because with the present configuration, less movement of the free end 48 is needed to reduce the normal force, and hence shear force, between the torsion clutch spring 42 and the pinion 36.

The freewheel backlash is known to be dependent on the materials used for both the torsion clutch spring 42 and the pinion 36, as well as any lubricant used in or near the torsion clutch spring 42 and the shaft 38 of the pinion 36, and the coefficient of friction and the interference fit between the torsion clutch spring 42 and the shaft 38 of the pinion 36. Thus, the optimum taper angle $\alpha$, i.e., in terms of overall brake actuating assembly 10 performance and freewheel backlash, to be used in any given brake actuating assembly 10 will be dependent on the materials used in the clutch assembly 34, and the coefficient of friction and the interference fit between the torsion clutch spring 42 and the shaft 38 of the pinion 36.

The taper angle $\alpha$ may be, for example, about 0.5° to about 2.0°. It has been found that, while keeping the aforementioned freewheel backlash variables constant in a given clutch assembly 34, providing a taper angle $\alpha$ of about 0.8° reduces the freewheel backlash by about 490%, and that providing a taper angle $\alpha$ of about 1.5° reduces the freewheel backlash by about 660%. The ranges of the taper angle $\alpha$ and the reductions in backlash identified above are meant to be exemplary and are not intended to be limiting in any way. It is understood that clutch assemblies that use different materials, coefficients of friction, and interference fits may yield different results, and that the optimum taper angle $\alpha$ for any given clutch assembly 34 may be greater than about 2.0°, or less than about 0.5°.

Figure 7:
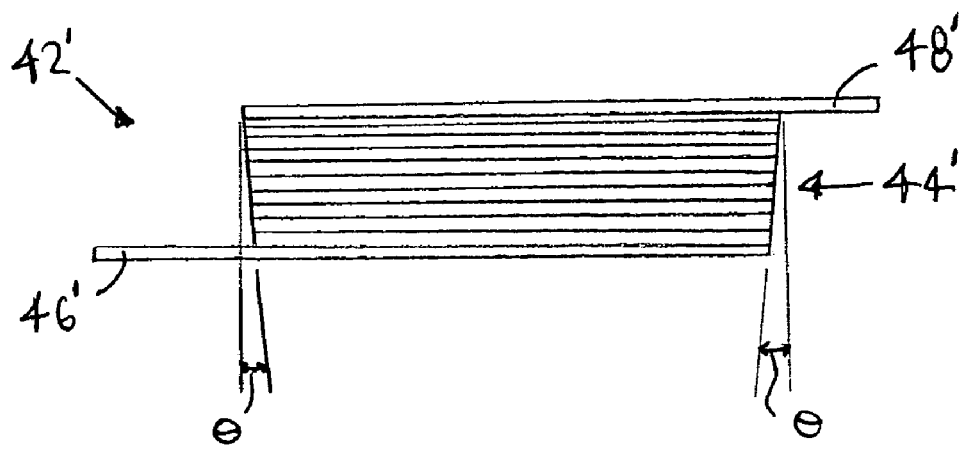
FIG. 7 is a side view of a torsion clutch spring of another embodiment of a clutch assembly according to the present invention.

It is also contemplated that in another embodiment, the outer diameter of the shaft of the pinion may be substantially constant from one end to the other and the inner diameter of a torsion clutch spring 42' may be tapered at a taper angle $\theta$, as represented in FIG. 7, such that the inner diameter of a coil 44' at a free end 48' of the torsion clutch spring 42' is greater than the inner diameter of the coil 44' at a fixed end 46' of the torsion clutch spring 42'. The taper angle $\theta$ of the torsion clutch spring 42' may be substantially the same as the taper angle $\alpha$ of the pinion 36, as described above. By providing a taper in the shaft 38 or the coils 44', the force required to uncoil the coils 44, 44' may be reduced, thereby decreasing the freewheel backlash and enhancing system performance.

As shown in FIGS. 2-5, a pusher 56 is movably mounted to the mounting bracket 12 and is constructed and arranged to engage the free end 48 of the torsion clutch spring 42 and move the free end 48 of the torsion clutch spring 42 in a direction that causes the torsion clutch spring 42 to move to the expanded position. This allows the pinion 36 to rotate in the second direction 52, which allows the lever 14 to move in the brake releasing direction 30.

The pusher 56 is preferably moved by a brake release 58 that is operatively connected to the pusher 56 so as to affect movement of the pusher 56 when the brake release 58 is actuated. The brake release 58, when actuated, moves the pusher 56 so that the pusher 56 engages the free end 48 of the torsion clutch spring 42. The actuator may be a solenoid valve that is actuated by a push button, or may be a button or handle 60, shown in FIGS. 2 and 3, that is connected to the pusher 56 via a cable 62 so that actuation of the button or handle 60 causes the cable 62 to move the pusher 56 into engagement with the free end 48 of the torsion clutch spring 42. The pusher 56 need only move the free end 48 of the torsion clutch spring 42 a sufficient amount to move the torsion clutch spring 42 to the expanded position, thereby allowing the pinion 36 to rotate in the second direction 52, as described above.

In operation, when the operator of the vehicle 1 would like to set the emergency/parking brake, the operator engages the lever 14 and moves the lever 14 in the brake applying direction 28. The interference fit of the torsion clutch spring 42 and the pinion 36 of the clutch assembly 34 causes the lever 14 to maintain its position, even if the operator temporarily removes his/her foot from the pedal pad 18 (or hand from the lever when the actuation assembly is a hand brake actuation assembly) before the brake 4 is fully engaged. The clutch assembly 34 provides the holding power necessary to keep the appropriate tension in the cable 8 while the brake 4 is engaged.

To release the brake 4, the operator actuates the brake release 58, which moves the pusher 56 into engagement with the free end 48 of the torsion clutch spring 42, thereby moving the torsion clutch spring 42 to the expanded position to allow the pinion 36 to rotate freely. The tension in the cable 8 allows the lever 14 to move in the brake releasing direction 30 to the fully released position 22. The brake 4 is not longer actuated, and the vehicle 1 is free to move.

While preferred embodiments of the invention have been shown and described, it is evident that variations and modifications are possible that are within the spirit and scope of the preferred embodiments described herein. The disclosed embodiments have been provided solely to illustrate the principles of the invention and should not be considered limiting in any way.

What is claimed is:

1. A brake actuating assembly for use in a vehicle having a brake system, the brake actuating assembly comprising:
    a mounting bracket for mounting the brake actuating assembly to the vehicle;
    a lever mounted to the mounting bracket for pivotal movement about a pivot axis in a brake applying direction and in a brake releasing direction, the lever being configured to be engaged and moved by a person in at least the brake applying direction,
        the lever being connectable to the brake system of the vehicle such that movement of the lever in the brake applying direction activates the brake system and movement of the lever in the brake releasing direction de-activates the brake system;
    an arcuate rack of teeth provided on one of the lever and the mounting bracket;
    a clutch assembly constructed and arranged to interact with the arcuate rack of teeth, the clutch assembly comprising
        a pinion provided on the other of the lever and the mounting bracket, the pinion comprising a shaft and a plurality of teeth disposed circumferentially around the shaft,
    the plurality of teeth engaging the arcuate rack of teeth; and
        a torsion clutch spring comprising a plurality of coils, a fixed end at one end of the coils, and a free end at an opposite end of the coils, the coils being wrapped around the shaft of the pinion, the fixed end being connected to said other of the lever and the mounting bracket,
            the torsion clutch spring normally being in a contracted position frictionally engaging the shaft of the pinion in an interference fit, the torsion clutch spring in the contracted position being arranged to (a) allow the pinion to rotate in a first rotational direction caused by movement of the lever in the brake applying direction, and (b) prevent rotation of the pinion in a second rotational direction opposite the first rotational direction to thereby prevent movement of the lever in the brake releasing direction;
            the free end of the torsion clutch spring being movable to move the torsion clutch spring to an expanded position allowing the pinion to rotate in both the first and second rotational directions, thereby allowing the lever to move in both the brake applying and releasing directions; and
        wherein at least one of the shaft of the pinion and the torsion clutch spring is tapered in an axial direction thereof such that the interference fit between the torsion clutch spring and the shaft is lower near the free end of the torsion clutch spring than near the fixed end of the torsion clutch spring.

2. A brake actuating assembly according to claim 1, wherein the lever is a pedal arm having a pedal pad on a distal end thereof away from the pivot axis, the pedal pad being configured to be engaged by the person's foot.

3. A brake actuating assembly according to claim 1, further comprising a pusher movably mounted to the mounting bracket, the pusher being constructed and arranged to engage the free end of the torsion clutch spring and move the free end of the torsion clutch spring in a direction that causes the coils to uncoil, which allows the pinion to rotate in the second direction, thereby allowing the lever to move in the brake releasing direction.

4. A brake actuating assembly according to claim 3, further comprising a brake release operatively connected to the pusher so as to affect movement of the pusher when the brake release is actuated.

5. A brake actuating assembly according to claim 4, wherein the brake release comprises a handle and a cable connected to the handle and the pusher.

6. A brake actuating assembly according to claim 1, wherein the shaft of the pinion is tapered in the axial direction at a taper angle.

7. A brake actuating assembly according to claim 6, wherein the taper angle is between about 0.5° and about 2.0°.

8. A brake actuating assembly according to claim 7, wherein the taper angle is between about 0.8° and about 1.5°.

9. A brake actuating assembly according to claim 1, wherein the torsion clutch spring is tapered in the axial direction at a taper angle.

10. A clutch assembly for a brake actuating assembly for use in a vehicle having a brake system, the brake actuating assembly comprising a mounting bracket and a lever mounted to the mounting bracket for pivotal movement about a pivot axis in a brake applying direction and a brake releasing direction, the lever being configured to be engaged and moved by a person in at least the brake applying direction, and being connectable to the brake system of the vehicle such that movement of the lever in a brake applying direction activates the brake system and movement of the lever in a brake releasing direction de-activates the brake system, the clutch assembly comprising:
    a pinion constructed and arranged to be provided on at least one of the lever and the mounting bracket, the pinion comprising a shaft and a plurality of teeth disposed circumferentially around the shaft, the plurality of teeth being configured to engage an arcuate rack of teeth provided on the other of the lever and the mounting bracket; and
    a torsion clutch spring comprising a plurality of coils, a fixed end at one end of the coils, and a free end at an opposite end of the coils, the coils being wrapped around the shaft of the pinion, the fixed end being connectable to said other of the lever and the mounting bracket, the torsion clutch spring normally being in a contracted position frictionally engaging the shaft of the pinion in an interference fit, the torsion clutch spring in the contracted position being arranged to (a) allow the pinion to rotate in a first rotational direction caused by movement of the lever in the brake applying direction, and (b) prevent rotation of the pinion in a second rotational direction opposite to the first rotational direction to thereby prevent movement of the lever in the brake releasing direction;

the free end of the torsion clutch spring being movable to move the torsion clutch spring to an expanded position allowing the pinion to rotate in both the first and second rotational directions, thereby allowing the lever to move in both the brake applying and releasing directions; and wherein at least one of the shaft of the pinion and torsion clutch spring is tapered in an axial direction thereof such that the interference fit between the torsion clutch spring and the shaft is lower near the free end of the torsion clutch spring than near the fixed end of the torsion clutch spring.

11. A clutch assembly according to claim 10, wherein the shaft of the pinion is tapered in the axial direction at a taper angle.

12. A clutch assembly according to claim 11, wherein the taper angle is between about 0.5° and about 2.0°.

13. A clutch assembly according to claim 12, wherein the taper angle is between about 0.8° and about 1.5°.

14. A clutch assembly according to claim 10, wherein the torsion clutch spring is tapered in the axial direction at a taper angle.

15. A vehicle with a brake system and a brake actuating assembly, the brake actuating assembly comprising:

a mounting bracket for mounting the brake actuating assembly to the vehicle;

a lever mounted to the mounting bracket for pivotal movement about a pivot axis in a brake applying direction and in a brake releasing direction, the lever being configured to be engaged and moved by a person in at least the brake applying direction, the lever being connectable to the brake system of the vehicle such that movement of the lever in the brake applying direction activates the brake system and movement of the lever in the brake releasing direction de-activates the brake system;

an arcuate rack of teeth provided on one of the lever and the mounting bracket;

a clutch assembly constructed and arranged to interact with the arcuate rack of teeth, the clutch assembly comprising
a pinion provided on the other of the lever and the mounting bracket, the pinion comprising a shaft and a plurality of teeth disposed circumferentially around the shaft, the plurality of teeth engaging the arcuate rack of teeth; and a torsion clutch spring comprising a plurality of coils, a fixed end at one end of the coils, and a free end at an opposite end of the coils, the coils being wrapped around the shaft of the pinion, the fixed end being connected to said other of the lever and the mounting bracket, the torsion clutch spring normally being in a contracted position frictionally engaging the shaft of the pinion in an interference fit, the torsion clutch spring in the contracted position being arranged to (a) allow the pinion to rotate in a first rotational direction caused by movement of the lever in the brake applying direction, and (b) prevent rotation of the pinion in a second rotational direction opposite the first rotational direction to thereby prevent movement of the lever in the brake releasing direction;

the free end of the torsion clutch spring being movable to move the torsion clutch spring to an expanded position allowing the pinion to rotate in both the first and second rotational directions, thereby allowing the lever to move in both the brake applying and releasing directions; and wherein at least one of the shaft of the pinion and the torsion clutch spring is tapered in an axial direction thereof such that the interference fit between the torsion clutch spring and the shaft is lower near the free end of the torsion clutch spring than near the fixed end of the torsion clutch spring.

16. A vehicle according to claim 15, wherein the lever is a pedal arm having pedal pad on a distal end thereof away from the pivot axis, the pedal pad being configured to be engaged by the person's foot.

17. A vehicle according to claim 15, further comprising a pusher movably mounted to the mounting bracket, the pusher being constructed and arranged to engage the free end of the torsion clutch spring and move the free end of the torsion clutch spring in a direction that causes the coils to uncoil, which allows the pinion to rotate in the second direction, thereby allowing the lever to move in the brake releasing direction.

18. A vehicle according to claim 17, further comprising a brake release operatively connected to the pusher so as to affect movement of the pusher when the brake release is actuated.

19. A vehicle according to claim 18, wherein the brake release comprises a handle and a cable connected to the handle and the pusher.

20. A vehicle according to claim 15, wherein the shaft of the pinion is tapered in the axial direction at a taper angle.

21. A vehicle according to claim 20, wherein the taper angle is between about 0.5° and about 2.0°.

22. A vehicle according to claim 21, wherein the taper angle is between about 0.8° and about 1.5°.

23. A vehicle according to claim 15, wherein the torsion clutch spring is tapered in the axial direction at a taper angle.

* * * * *